United States Patent
Matsumoto et al.

(10) Patent No.: US 7,153,450 B2
(45) Date of Patent: Dec. 26, 2006

(54) METHOD AND APPARATUS FOR PREPARING RARE EARTH-ACTIVATED BARIUM FLUOROHALIDE BASED PHOSPHOR

(75) Inventors: Hiroshi Matsumoto, Kanagawa (JP); Yasuo Iwabuchi, Kanagawa (JP); Kenji Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 648 days.

(21) Appl. No.: 10/193,985

(22) Filed: Jul. 15, 2002

(65) Prior Publication Data
US 2003/0007921 A1    Jan. 9, 2003

Related U.S. Application Data

(63) Continuation of application No. 09/631,998, filed on Aug. 3, 2000, now abandoned.

(30) Foreign Application Priority Data

Sep. 1, 1999 (JP) ................................. 11-247274

(51) Int. Cl.
*C09K 11/61* (2006.01)
*C01F 11/20* (2006.01)

(52) U.S. Cl. ............................................. 252/301.4 H
(58) Field of Classification Search ...................... None
See application file for complete search history.

(56) References Cited

U.S. PATENT DOCUMENTS

| 4,505,989 | A | * | 3/1985 | Umemoto et al. ........... 428/691 |
| 4,932,864 | A | | 6/1990 | Miyabe |
| 5,534,191 | A | | 7/1996 | Hasagawa et al. |
| 5,629,125 | A | | 5/1997 | Leblans et al. |
| 5,746,589 | A | | 5/1998 | Itoh et al. |
| 6,290,873 | B1 | * | 9/2001 | Takahashi et al. ... 252/301.4 H |

FOREIGN PATENT DOCUMENTS

| EP | 0 533 233 A1 | 8/1992 |
| EP | 0 533 234 A1 | 3/1993 |
| EP | 712917 | * 5/1996 |
| EP | A2712917 | 5/1996 |
| JP | 64-1399 U | 1/1989 |
| JP | 6-340873 A | 12/1994 |
| JP | 8-85786 A | 4/1996 |
| JP | 11-106748 A | 4/1999 |
| WO | WO/ 98/37165 | 8/1998 |

* cited by examiner

Primary Examiner—C. Melissa Koslow
(74) *Attorney, Agent, or Firm*—Birch, Stewart, Kolasch, and Birch, LLP

(57) ABSTRACT

The present invention provides a method and apparatus for preparing a rare earth-activated barium fluorohalide based phosphor, in which atmospheric states during calcining and during cooling can be optimally adjusted and a cooling rate can be selected in a wide range. In the preparing apparatus of the present invention, a mixture 18 of phosphor materials is calcined by a calcining furnace 10 to form a calcined product, and thereafter, the calcined product is cooled to thereby prepare a rare earth-activated barium fluorohalide based phosphor. A calcining region 12 in which the mixture of phosphor materials can be calcined is provided in the calcining furnace 10, and a portion of the calcining region 12 is connected, via a partition door 30 capable of being opened and closed, to a cooling region 28 in which the calcined product can be cooled, at an outer side of the calcining furnace 10. Further, the method for preparing the rare earth activated barium fluorohalide based phosphor of the present invention is carried out by using the above-described preparing apparatus.

12 Claims, 3 Drawing Sheets

METHOD AND APPARATUS FOR PREPARING RARE EARTH-ACTIVATED BARIUM FLUOROHALIDE BASED PHOSPHOR

This application is a continuation of co-pending application Ser. No. 09/631,998, filed on Aug. 3, 2000, now abandoned, the entire contents of which are hereby incorporated by reference and for which priority is claimed under 35 U.S.C. 120; and this application claimed priority of Application No. 11-247274, filed in Japan on Sep. 1, 1999 under 35 U.S.C. 119.

BACKGROUND OF THE INVENTION

1. Field of the Invention

The present invention relates to a method and apparatus for preparing a rare earth-activated barium fluorohalide based phosphor useful as a stimulable phosphor for a radiation image conversion panel.

2. Description of the Related Art

A radiation image recording and reproducing method using a stimulable phosphor (which will be hereinafter referred to simply as "phosphor" on occasion) is known, which can replace conventional radiography. This method utilizes a radiation image conversion panel containing a stimulable phosphor (that is, an accumulative phosphor sheet). In this method, radiation transmitted through a subject or emitted from an object to be examined is absorbed into the stimulable phosphor of the above-mentioned panel, and the stimulable phosphor is excited by an electromagnetic wave (excitation light) such as visible light or infrared light in a time sequential manner so as to allow radiation energy accumulated in the stimulable phosphor to emit as fluorescent emission (stimulable emission). Subsequently, an electric signal is obtained by photoelectrically reading the fluorescence, and based on the obtained electric signal, a radiation image of the subject or object to be examined is reproduced as a visible image. The panel for which the reading has been completed is made ready for subsequent photographing after remaining images have been deleted therefrom. That is, the radiation image conversion panel can be used repeatedly.

The above-described radiation image recording and reproducing method has an advantage in that a radiation image having much information can be obtained using a radiation dosage much smaller than in conventional radiography using a combination of a radiographic film and an intensifying screen. Further, a radiographic film is consumed each time an image is produced in conventional radiography. In contrast, a radiation image conversion panel in the radiation image recording and reproducing method is advantageous from the standpoint of resource protection and economic efficiency due to reusability.

The stimulable phosphor is a phosphor which exhibits stimulable emission when excitation light is irradiated thereon after having being irradiated with radiation. For practical use, a phosphor which emits stimulable emission in a wavelength ranging from 300 to 500 nm by excitation light in a wavelength ranging from 400 to 900 nm is generally employed. An example of the stimulable phosphor conventionally used in radiation image conversion panels, is a rare earth-activated barium fluorohalide based phosphor.

The rare earth-activated barium fluorohalide based phosphor is generally prepared by the following method.

First, a mixture of phosphor materials is prepared by homogeneously mixing phosphor materials in a dried state (a dry process) or by homogeneously mixing phosphor materials to form a slurry and thereafter drying the slurry (a wet process).

Subsequently, the obtained mixture of phosphor materials is ordinarily calcined at a temperature close to a melting point of a host crystal (for example, BaFX, or the like) in a neutral or weakly oxidizing atmosphere substantially under atmospheric pressure over several hours (calcining step). The obtained calcined product may be further calcined if desired. Due to the calcining step, the host crystal of the phosphor grows, and simultaneously, activator elements (Eu and the like) are diffused in the host crystal. Further, an $F^+$-center which forms a central source of stimulation is also generated. Accordingly, the calcining step is an important step which exerts an influence on the light emission characteristics of the phosphor.

The calcined product thus obtained is cooled, and if necessary, subjected to washing, classification, and the like, to thereby form a phosphor.

After the calcining, the calcined product is generally cooled in a calcining furnace in a state of being placed therein, or cooled after being taken out of the calcining furnace. However, if the calcined product is cooled in the calcining furnace, an atmosphere temperature in the calcining furnace is high and the temperature of each of various members in the calcining furnace is also high. Therefore, a cooling rate of the calcined product cannot be increased so much. Particularly, even when rapid quenching is required for adjustment of the characteristics of phosphors, there is a limit to the cooling rate, which is disadvantageous to the adjustment of the characteristics of phosphors.

On the other hand, if the calcined product is cooled after being taken out of the calcining furnace, the cooling rate can be further increased. However, the state of an atmosphere during the cooling cannot be adjusted. The state of an atmosphere during the cooling becomes an important factor for the adjustment of the characteristics of phosphors.

SUMMARY OF THE INVENTION

Accordingly, one object of the present invention is to provide an apparatus for preparing a rare earth-activated, barium fluorohalide based phosphor, in which respective atmosphere states during calcining and during cooling can be optimally adjusted and a cooling rate can be selected in a wide range.

Further, another object of the present invention is to provide a method for preparing a rare earth-activated, barium fluorohalide based phosphor using the above-described apparatus having excellent functions, in which conditions for obtaining a stimulable phosphor having good characteristics are provided.

The above-described objects are achieved by the present invention, which will be described below.

A first aspect of the present invention is an apparatus for preparing a rare earth-activated barium fluorohalide based phosphor by calcining a mixture of phosphor precursor materials. (For convenience, "phosphor precursor materials" are referred to hereinafter simply as "phosphor materials.") This apparatus of the invention comprises: (a) a calcining furnace having a calcining region interior for receiving a mixture of phosphor materials; (b) a heat source disposed for providing heat to the calcining region for calcining phosphor materials when received therein; and (c) a chamber having an interior cooling region connected by a path of fluid communication to the calcining region interior, and a partition selectively movable from closed to open positions, respectively substantially closing the path of fluid communication and opening the path of fluid communication.

A second aspect of the present invention is a method for preparing a rare earth-activated barium fluorohalide based phosphor, comprising the steps of: (a) preparing a mixture of phosphor materials; (b) calcining the mixture of phosphor materials in a calcining region of an apparatus for preparing a rare earth-activated barium fluorohalide based phosphor to form a calcined product; (c) cooling the calcined product by moving the calcined product into the cooling region of the apparatus and thereafter moving the partition to the closed position.

A third aspect of the present invention is a method for preparing a rare earth-activated barium fluorohalide based phosphor, comprising the steps of: (a) preparing a mixture of phosphor materials; (b) providing a furnace having a calcining chamber and a cooling chamber connected to the calcining chamber, with a partition selectively movable for opening and closing the chambers to and from one another; (c) calcining the mixture of phosphor materials in the calcining chamber, with the chambers closed from one another; and (d) cooling the calcined product by opening the chambers to one another and moving the calcined product into the cooling chamber and thereafter closing the chambers from one another.

In the apparatus for preparing a rare earth-activated barium fluorohalide based phosphor of the present invention, the calcining region (calcining chamber) for calcining the mixture of phosphor materials and the cooling region (cooling chamber) for cooling the calcined product after the calcining are clearly separated by the partition door, and therefore, the atmosphere suitable for each of the regions can be controlled independently. Further, the calcined product is moved from the calcining region in a high-temperature state after the calcining to the cooling region used only for cooling the calcined product, and therefore, quenching becomes possible and a cooling condition can be set in a wide range in accordance with purposes.

In the method for preparing a rare earth-activated barium fluorohalide based phosphor of the present invention, respective atmospheric states during the calcining and the cooling can be optimally adjusted. Further, in the above-described apparatus for preparing a rare earth-activated barium fluorohalide based phosphor of the present invention in which the cooling rate can be selected in a wide range, the characteristics of a stimulable phosphor to be obtained can be properly controlled.

DESCRIPTION OF THE PREFERRED EMBODIMENTS

The present invention will be hereinafter described in detail with reference to an embodiment of the present invention.

An apparatus for preparing a rare earth-activated, barium fluorohalide based phosphor of the present invention (hereinafter referred to simply as "phosphor of the present invention" on occasion) is characterized by that a portion of a calcining region provided in a calcining furnace is connected, via a partition door, to a cooling region at an outer side the calcining furnace. The calcining region and its peripheries in the calcining furnace are usually structured in such a manner that a reactor core tube is provided and heat sources are disposed outside the reactor core tube, and further, a calcining receptacle in which the mixture of phosphor materials can be accommodated is provided within the reactor core tube in a removable manner.

Figure 1:
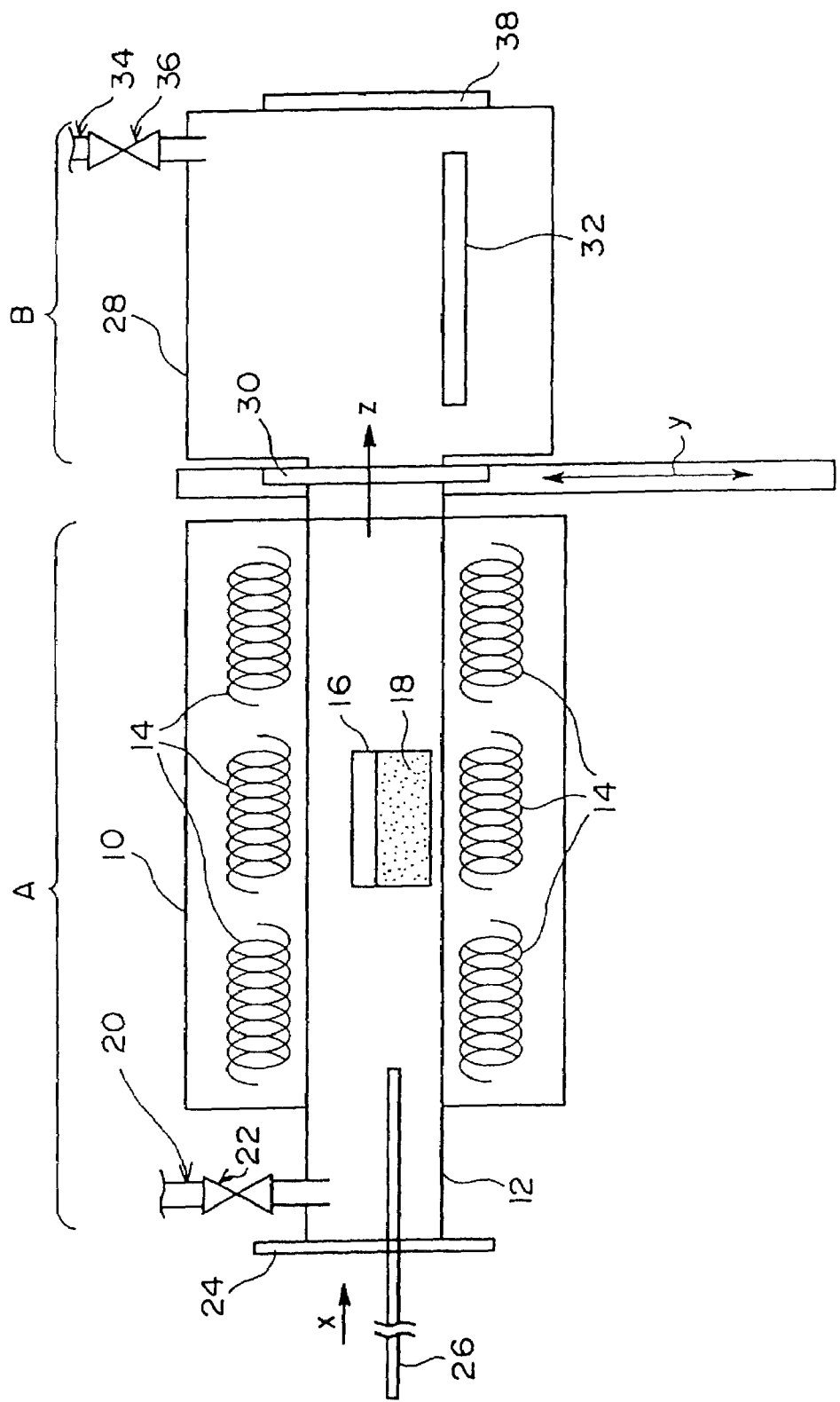
FIG. 1 is a schematic cross sectional diagram of an apparatus for preparing a rare earth-activated, barium fluorohalide based phosphor according to an example of an embodiment of the present invention.
Figure 2:
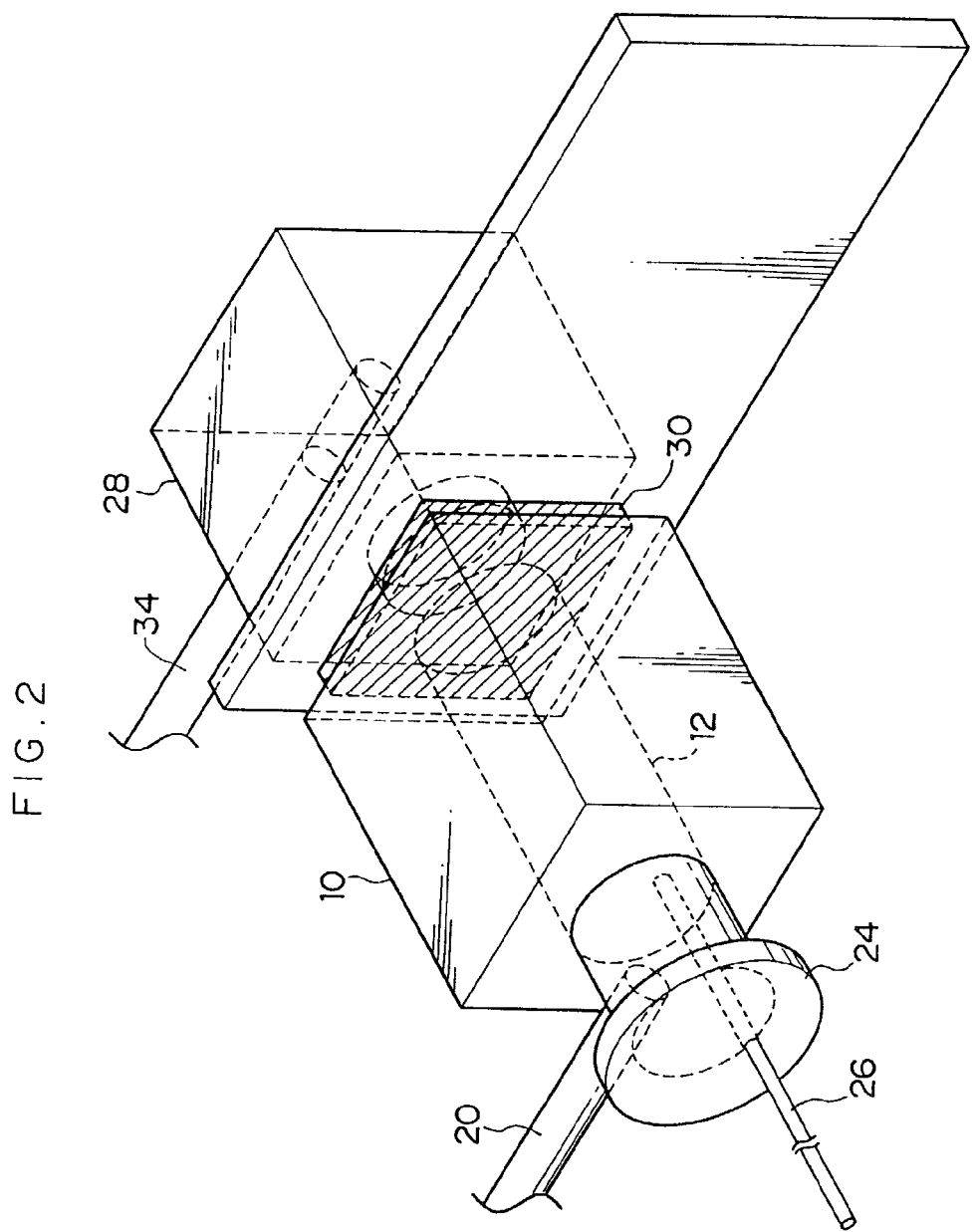
FIG. 2 is a perspective view of the apparatus for preparing a rare earth-activated, barium fluorohalide based phosphor shown in FIG. 1.

FIG. 1 is a schematic cross sectional diagram which shows an example of the phosphor preparing apparatus of the present invention. FIG. 2 is a perspective view of the phosphor preparing apparatus shown in FIG. 1. In FIG. 2, a portion of the internal structure of the apparatus, and the like is not shown.

The phosphor preparing apparatus shown in FIGS. 1 and 2 is mainly comprised of a calcining section A and a cooling section B. A description will be hereinafter given principally with reference to FIG. 1.

In FIG. 1, reference numeral 10 denotes a calcining furnace. A reactor core tube 12 forming a calcining region (calcining chamber) is disposed within the calcining furnace 10 in a state of passing through the furnace in a left-to-right direction in FIG. 1. Within the calcining furnace 10, heat sources 14 are provided at an outer side of the reactor core tube 12. The interior of the calcining furnace 10 is heated by the heat sources 14, and a mixture 18 of phosphor materials accommodated in a boat (calcining receptacle) 16 put into the reactor core tube 12 can thereby be calcined.

A gas introduction/exhaust pipe 20 communicates with the reactor core tube 12 via a valve 22 so as to allow introduction of gas into the reactor core tube 12 and exhaust of gas from the reactor core tube 12, and an internal atmosphere of the reactor core tube 12 can appropriately be adjusted. When gas is introduced from the gas introduction/exhaust pipe 20 so as to adjust the internal atmosphere of the reactor core tube 12, preferably, a device which can precisely measure a quantity of gas flowing, for example, a mass flow controller is used.

An opening portion of the reactor core tube 12 at the left end in FIG. 1 is closed by a sample charge opening lid 24 so as to maintain a sealed state of the interior of the reactor core tube 12 during the calcining and to allow the boat (calcining receptacle) 16 to be put into the reactor core tube 12. Further, a sample pushing rod 26 passes through the sample put-in opening lid 24 so as to slide the boat (calcining receptacle) 16 put into the reactor core tube toward a right side in FIG. 1 without opening the sample put-in opening lid 24.

The boat (calcining receptacle) 16 is formed by a heat resisting receptacle, for example, a quartz boat, an alumina crucible, a quartz crucible, or a silicon carbide receptacle. Further, examples of the heat sources 14 include all of conventionally known heat sources. For example, a known electric heater can be employed.

An opening portion of the reactor core tube 12 at the right end in FIG. 1 is closed by a partition door 30 in such a manner that internal sealing within the reactor core tube 12 during the calcining and within a cooling chamber (cooling region) 28 during the cooling is maintained by intercepting communication between a calcining section A and a cooling section B and the boat (calcining receptacle) 16 can be discharged into the cooling section B after the calcining. The partition door 30 slides in directions indicated by doubleheaded arrow y so as to intercept communication between the calcining section A and the cooling section B and allow the communication therebetween. The partition door 30 is generally formed from metal such as stainless steel, quartz, or ceramics such as alumina. Preferably, it is formed from a heat insulating material. The term "heat insulating material" mentioned herein means, for example, ceramics having a small heat conductivity (zirconia, mica, and the like), porous ceramics, and a multilayered structure thereof. Further, to obtain more reliable heat insulation, means for cooling the peripheries of the partition door 30 and/or the cooling chamber 28 by water cooling or the like may also be provided.

In calcining the mixture 18 of phosphor materials, first, the mixture 18 of phosphor materials is accommodated in the boat (calcining receptacle) 16 and the boat 16 is put into the reactor core tube 12 with the sample put-in opening lid 24 being opened. Subsequently, with the sample put-in opening lid 24 being closed into a sealed state (in this case, the partition door 30 is also in a closed state), the boat (calcining receptacle) 16 in which the mixture 18 of phosphor materials is accommodated is moved slidably by pushing the sample pushing rod 26 in the direction indicated by arrow x and placed at a predetermined position. Then, calcining is carried out by employing heat from the heat sources 14 while the internal atmosphere of the reactor core tube 12 is being brought into a predetermined condition by appropriately discharging and/or introducing gas using the gas introduction/exhaust pipe 20. Calcining conditions at this time (atmosphere, temperature, time, number of stages of calcining temperature and atmosphere, and the like) can be set appropriately in accordance with purposes.

After the calcining, the partition door 30 is opened and the boat (calcining receptacle) 16 in which the calcined mixture 18 of phosphor materials (calcined product) is accommodated is slid by the sample pushing rod 26 in the direction indicated by arrow z and moved into the cooling section B.

The reactor core tube 12 may be formed into an arbitrary shape, for example, a cylinder or a rectangular tube. The size of the reactor core tube 12 is set appropriately in accordance with purposes and the diameter of a cross section thereof (when the reactor core tube is not formed into a cylinder, the diameter of a circle corresponding to an area of the cross section) is selected in a range nearly from 50 to 2000 mm, and preferably 100 to 1200 mm. Further, in the reactor core tube 12, desirably, the calcining region has a capacity of 2 to 500 liters, preferably 5 to 50 liters, for 1 kg of the mixture of phosphor materials to be calcined. If the capacity of the calcining region is smaller than 2 liters for 1 kg of the mixture of phosphor materials, the mixture of phosphor materials is in a state of being packed tightly in a small space and it may become difficult to carry out homogeneous calcining as a whole. If the capacity of the calcining region is greater than 500 liters, a volatile halogen atmosphere is extremely low and the amount of stimulable emission light of a stimulable phosphor to be obtained, the erasability thereof, and the like may deteriorate.

The cooling section B is structured in such a manner that a cooling stand 32 is disposed in the cooling chamber 28 which is a cooling region. A gas introduction/exhaust pipe 34 for a cooling chamber communicates with the cooling chamber 28 via a valve 36 so as to allow introduction of gas into the cooling chamber 28 and exhaust of gas from the cooling chamber 28, and the internal atmosphere of the cooling chamber 28 can appropriately be adjusted. When gas is introduced from the gas introduction/exhaust pipe 34 for the cooling chamber so as to adjust the internal atmosphere of the cooling chamber 28, preferably, a device which can precisely measure a quantity of gas flowing, for example, a mass flow controller may be employed.

An opening portion is formed at the right end of the cooling chamber 28 in FIG. 1 and is closed by a sample outlet lid 38 so as to maintain a sealed state within the cooling chamber 28 during the cooling and to discharge the boat (calcining receptacle) 16 outside.

As previously described above, the boat (calcining receptacle) 16 in which a calcined product of the mixture 18 of phosphor materials calcined in the calcining section A is accommodated is moved to slide in the direction indicated by arrow z and mounted on the cooling stand 32 in the cooling section B in a state of being supported by a guide (not shown in the drawings). Thereafter, the partition door 30 in the opened state is again closed into a sealed state (the sample outlet lid 38 is also in a closed state). The internal atmosphere of the cooling chamber 28 is brought into a predetermined state by appropriately discharging and/or introducing gas using the gas introduction/exhaust pipe 34 for the cooling chamber, and simultaneously, the cooling stand 32 is cooled by cooling means such as water-cooling (not shown in the drawings) and the mixture 18 of the phosphor materials accommodated in the boat (calcining receptacle) 16 is also cooled. At this time, cooling conditions (atmosphere, temperature, time, the number of stages of cooling temperature and atmosphere, and the like) can be set appropriately in accordance with purposes. Further, the mixture of phosphor materials may be naturally cooled in a state of being kept still without particularly providing the cooling means such as water-cooling.

In the cooling chamber 28, preferably, the capacity of the cooling region is 2 to 1000 liters, and more preferably 20 to 400 liters, for 1 kg of the calcined product to be cooled. If the capacity of the cooling region is smaller than 2 liters for 1 kg of the calcined product, the calcined product is in a state of being packed tightly in a small space and cooling efficiency deteriorates and there are cases in which it may be difficult to carry out homogeneous cooling as a whole. If the capacity of the cooling region is greater than 2000 liters, the atmosphere in the cooling chamber 28 is difficult to become uniform and the apparatus becomes inefficient.

The boat (calcining receptacle) 16 in which the mixture 18 of phosphor materials having been subjected to predetermined cooling is accommodated is taken out by opening the sample outlet lid 38 and a desired rare earth-activated alkaline earth metal fluorohalide based phosphor is prepared.

Figure 3:
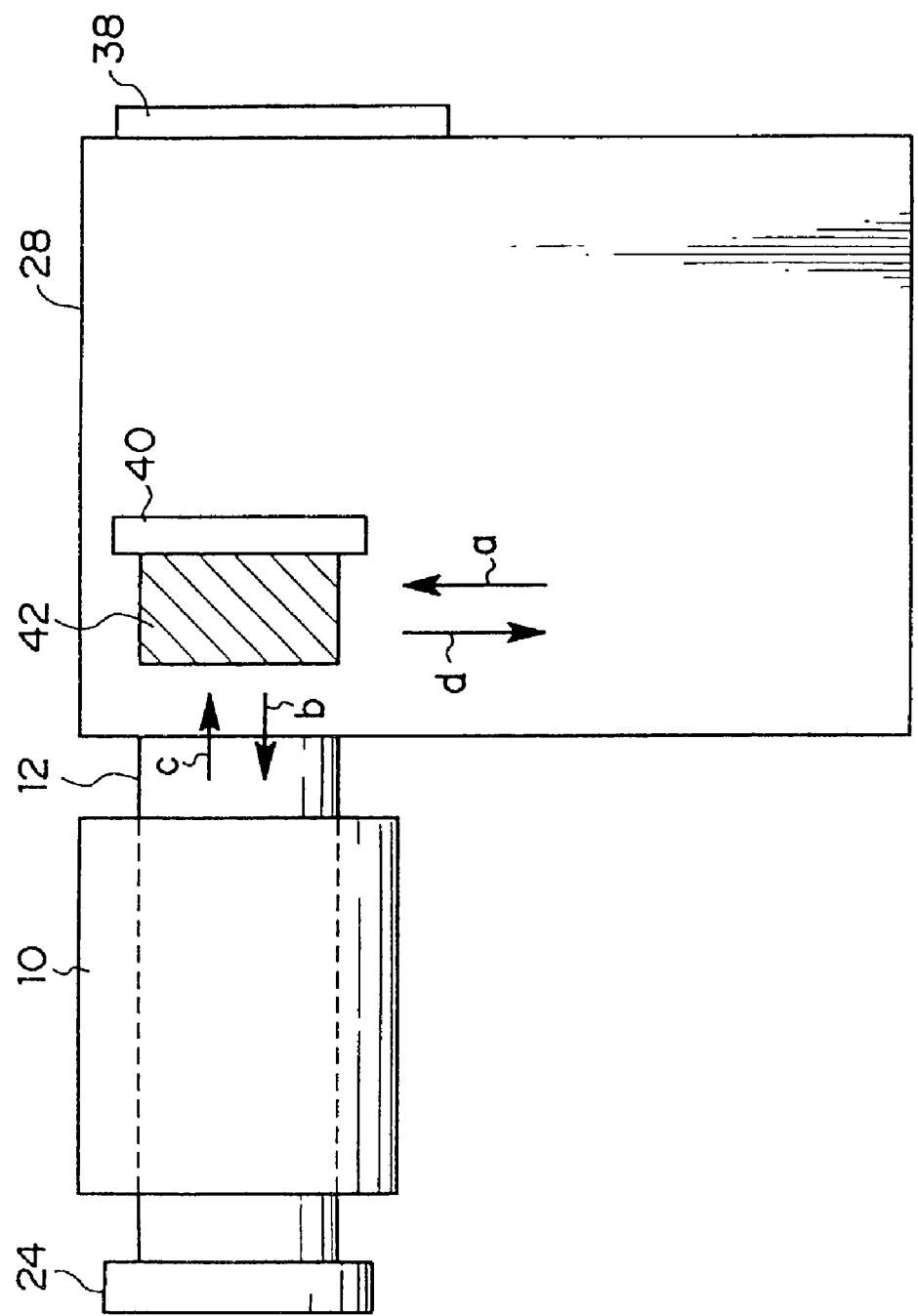
FIG. 3 is a schematic cross sectional diagram of an apparatus for preparing a rare earth-activated, barium fluorohalide based phosphor according to another example of the embodiment of the present invention.

The phosphor preparing apparatus of the present invention is thus described by means of the apparatus shown in FIGS. 1 and 2, but the present invention is not limited to the same. As illustrated in FIG. 3, a partition door 40 having a heat insulating member 42 and formed as a lid may be structured so as to slide sequentially in directions indicated by arrows a, b, c, and d. That is, in order that the partition door 40 be closed into a sealed state, the partition door 40 is moved to slide in the direction indicated by arrow a and further in the direction indicated by arrow b, and engaged with an opening portion of the reactor core tube 12 at the right end in FIG. 3 so as to maintain a completely sealed state and a heat retaining property in the reactor core tube 12. Further, in order that the partition door 40 be opened, the partition door 40 is moved to slide in the direction indicated by arrow c and further in the direction indicated by arrow d, and the opening portion of the reactor core tube 12 at the right end in FIG. 3 can be completely opened. Therefore, a calcined product (not shown in the drawings) within the reactor core tube 12 can easily be moved into the cooling chamber 28.

In the present invention, the description "the partition door is made of a heat insulating material" also includes a structure in which the partition door 40 is provided with the heat insulating member 42 as shown in FIG. 3. Examples of materials of the heat insulating member 42 include heat insulating materials having heat resisting property, such as porous ceramics and kaowool, glass wool packed in a hollow receptacle made from quartz or the like, and the like.

In FIG. 3, the members denoted by the same reference numerals as those in FIGS. 1 and 2 each have the same function. Further, the heat sources 14, the boat (calcining receptacle) 16, the mixture 18 of phosphor materials, the valve 22, the sample pushing rod 26, the cooling stand 32, and the valve 36 are not illustrated in FIG. 3.

In the above-described embodiment, the structure in which the reactor core tube 12 which is the calcining region is disposed in a state of passing through the calcining furnace 10 was shown, but the present invention is not limited to the same. For example, there may also be applied a structure in which the left end of the reactor core tube 12 in FIG. 1 is closed within the calcining furnace 10 and a sample is charged and discharged from the calcining furnace 10 at the side of the cooling chamber (cooling region) 28.

Next, a description will be given of a method for preparing a rare earth-activated barium fluorohalide based phosphor of the present invention.

The method for preparing a rare earth-activated barium fluorohalide based phosphor of the present invention (hereinafter referred to simply as "preparing method of the present invention" on occasion) comprises the steps of: mixing phosphor materials to prepare a mixture of phosphor materials (mixing step); calcining the mixture of phosphor materials to form a calcined product (calcining step); and cooling the calcined product after the calcining (cooling step). An operation between the calcining step and the cooling step is carried out by the above-described apparatus for preparing a rare earth-activated barium fluorohalide based phosphor of the present invention.

Namely, the calcining step is performed by putting the mixture of phosphor materials into the calcining region, and between the calcining step and the cooling step, a step of moving the calcined product into the cooling region by opening the partition door and closing again the partition door is provided. The cooling step is performed by putting the calcined product into the cooling region. The cooled stimulable phosphor may further be subjected to general various processes including washing, drying, screening, and the like if necessary.

The above-described steps will each be described hereinafter.

[Mixing Step]

In the mixing step, a mixture of phosphor materials is prepared by mixing phosphor materials. Examples of the phosphor materials include the following materials (1) to (5):

(1) at least one kind of barium halide selected from the group consisting of $BaF_2$, $BaCl_2$, $BaBr_2$, $BaI_2$, BaFBr, BaFCl, and BaFI, provided, however, at least one of which contains fluorine (F);

(2) at least one kind of alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$, and $MgI_2$;

(3) at least one kind of alkaline metal halide selected from the group consisting of CsCl, CsBr, CsI, NaCl, NaBr, NaI, KCl, KBr, KI, RbCl, RbBr, RbI, RbF, CsF, NaF, KF, LiF, LiCl, LiBr, and LiI;

(4) at least one kind of metal oxide selected from the group consisting of $Al_2O_3$, $SiO_2$, and $ZrO_2$; and (5) at least one kind of compound selected from the group consisting of rare earth element compounds such as halide, oxide, nitrate, and sulfate.

If desired, ammonium halide ($NH_4X'$; wherein X' is F, Cl, Br, or I) or the like may be used as a flux.

The preparation of the mixture of phosphor materials is carried out by arbitrarily selecting desired materials from each of the above-described materials (1) to (5) and stoichiometrically measuring by weight and mixing the materials at a relative composition ratio corresponding to a composition formula (I), which will be given later.

The method for preparing the mixture of phosphor materials can be appropriately selected from known mixing methods. For example, the mixture of phosphor materials may be prepared by any one of the following processes (i) to (iv):

(i) a process in which the above-described phosphor materials (1) to (5) are measured and simply mixed;

(ii) a process in which the phosphor materials (1) to (4) are measured and mixed, and a resultant mixture is heated at a temperature of 100° C. or higher for several hours, and thereafter, the phosphor material (5) is mixed with the obtained heat-treated product;

(iii) a process in which the phosphor materials (1) to (5) are mixed together and a resultant mixture is heated at a temperature of 100° C. or higher for several hours; and (iv) a process in which the phosphor materials (1) to (4) are mixed in a state of suspension, and the obtained suspension is dried under reduced pressure, vacuum drying, or spray drying while being heated preferably at 50 to 200° C., and thereafter, the phosphor material (5) is mixed with the obtained dry product.

Further, as modifications of the above-described preparation process (iv), there can also be favorably applied the following processes (iv-2), (iv-3), and the like:

(iv-2) a process in which the phosphor materials (1) to (5) are mixed in a state of suspension and a resultant suspension is dried; and (iv-3) a process in which a suspension containing the phosphor materials (1) and (5) is heated preferably to 50 to 200° C. or dried under reduced pressure, vacuum drying, or spray drying while being heated to the above-mentioned temperature, and thereafter, the phosphor materials (2) to (4) are added to, and mixed with, the obtained mixture.

Further, a method for preparing a rare earth-activated, alkaline earth metal fluorohalide based stimulable phosphor having a tetradecahedral structure in which the grain shape and the grain aspect ratio are controlled, which is disclosed in Japanese Patent Application Laid-Open (JP-A) Nos. 7-233369 and 10-195431, that is, in addition to the above-described processes for preparing the mixture of phosphor materials (i) to (iv-3), a preparing process (v) in which means for applying shearing force is employed in mixing phosphor materials, and a preparing process (vi) in which means for controlling various conditions including a timing of addition of, and mixing of, various phosphor materials, and the like may also be used.

A mixing device used for the mixing in the above-described preparing processes (v) and (vi) can be appropriately selected from known mixing devices and used. For example, various mixers, a V-type blender, a ball mill, and a rod mill can be used.

For the purpose of further improvement in the amount of stimulable emission, the erasability, and the like when the phosphor represented by the constitutional formula (I) is prepared, the following various addition components can also be added.

For example, B disclosed in JP-A No. 57-23673, As disclosed in JP-A No. 57-23675, a compound of tetrafluoroboric acid disclosed in JP-A No. 59-27980, a hexafluoro compound disclosed in JP-A No. 59-47289, transition metals such as V, Cr, Mn, Fe, Co, and Ni disclosed in JP-A No. 59-56480, and BeX"2 (wherein X" represents at least one kind of halogen atom selected from the group consisting of F, Cl, Br, and I) disclosed in JP-A No. 59-75200 can be used.

When the above-mentioned additional component is added, the additional component is added and mixed in measuring and mixing the phosphor materials or before the calcining.

[Calcining Step]

An operation from the calcining step to the cooling step will be hereinafter described with reference to FIG. 1. However, the present invention is not limited to the apparatus shown in FIG. 1.

The calcining step is carried out by putting the mixture 18 of phosphor materials into the reactor core tube 12 which is the calcining region. Specifically, the boat (calcining receptacle) 16 in which the mixture 18 of phosphor materials is accommodated is put into the reactor core tube 12, and the interior of the calcining furnace 10 is heated to a high temperature due to heat from the heat sources 14. In this state, the mixture 18 of phosphor materials is calcined to thereby form a calcined product of the mixture 18 of phosphor materials.

The calcining temperature is preferably in the range from 500 to 1100° C., and more preferably in the range from 700 to 1000° C. Further, it is also preferable that a constant temperature in the above-described range be maintained.

If the calcining temperature is less than 500° C., diffusion of activator elements in the host crystal and generation of $F^+$ which forms a central source of stimulation may be insufficient. If the calcining temperature is greater than 1100° C., the host crystal may be molten.

The calcining time is generally 1 to 10 hours, preferably 1 to 5 hours, although it varies depending on the amount of the mixture of phosphor materials charged, the calcining temperature, the temperature at which the mixture is taken out of a furnace, and the like.

If the calcining time is less than 1 hour, diffusion of activator elements in the host crystal and generation of $F^+$ which forms a central source of stimulation may be insufficient. Even if the calcining is carried out for more than 10 hours, there is little change in the characteristics of phosphor, and productivity may be deteriorated.

In the reactor core tube 12 during the calcining, an atmosphere in which neutral or weakly oxidizing atmospheric gas is contained is preferably employed.

Examples of the neutral atmospheric gas include inert gas such as He, Ne, Ar, $N_2$, or the like.

To generate the weakly oxidizing atmospheric gas, oxygen in the amount of 0.1 to 200 ml, preferably 1 to 100 ml at calcined room temperature per 1 L of the capacity of the calcining region in the furnace is introduced from the gas introduction/exhaust pipe 20. Introduced into the remaining portion of the calcining region is inert gas such as He, Ne, Ar, or $N_2$. If the amount of oxygen introduced is less than 0.1 ml, effects of improvement in erasability of a stimulable phosphor cannot sufficiently be obtained. If the amount is greater than 200 ml, an amount of stimulable emission light may remarkably deteriorate.

The method for introducing oxygen into neutral gas is not particularly limited, and can be appropriately selected from known introducing methods. Among these methods, there is preferably used a method in which the interior of the reactor core tube 12 is temporarily brought into near a vacuum using the gas introduction/exhaust pipe 20, and thereafter, a predetermined amount of oxygen is introduced into the reactor core tube 12 and calcining is carried out in the calcining region in an weakly oxidizing atmosphere. A required amount of oxygen can be accurately introduced into the reactor core tube 12, and simultaneously, influences of other gases can be minimized.

In this way, oxygen in an amount required for improvement in erasability of the stimulable phosphor can be introduced in the step of calcining the mixture of phosphor materials by specifying the capacity of the calcining region of the calcining furnace for 1 kg of the mixture of phosphor materials to be calcined and the amount of oxygen introduced for 1 L of the capacity of the calcining region.

Further, by substituting gas containing a predetermined amount of oxygen for gas within the reactor core tube 12, the amount of oxygen within the reactor core tube 12 can be introduced while changing the amount of oxygen gradually or continuously.

A desired amount of oxygen can be introduced, for example, by the following operation.

First, the boat (calcining receptacle) 16 in which the mixture 18 of phosphor materials is accommodated is placed in the calcining furnace 10 of which calcining temperature has reached the calcining temperature, and immediately thereafter, evacuation is carried out by the gas introduction/exhaust pipe 20 for several minutes to exhaust air from the reactor core tube 12. In this case, the calcining can be carried out so long as the interior of the reactor core tube 12 is under near a vacuum, but the degree of vacuum is preferably 0.1 torr or less for the reason that the amount of oxygen present in the atmosphere need be accurately set.

Next, a predetermined amount of oxygen is supplied into the reactor core tube 12 and charged to a desired atmospheric pressure. At this time, the amount of oxygen introduced is, as described above, preferably 0.1 to 200 ml per 1 L of the capacity of the calcining region of the reactor core tube. The amount of oxygen introduced is represented by the volume at the calcining temperature.

After the predetermined amount of oxygen has been properly introduced into the reactor core tube 12, the above-described neutral gas is further introduced into the reactor core tube 12 and the atmospheric pressure in the reactor core tube 12 is set to be about 760 torr (1 atm.), that is, a value close to atmospheric pressure, and a weakly oxidizing atmosphere can thereby be generated within the reactor core tube.

When the interior of the reactor core tube 12 is adjusted into a weakly oxidizing atmosphere, for example, oxygen-containing gas such as air, or inert gas may be introduced into the reactor core tube in place of oxygen.

As the amount of oxygen-containing gas introduced such as air, generally, an amount of gas required to have the same amount of oxygen as that in the above-described case in which only oxygen is introduced is preferably introduced. The amount of oxygen-containing gas introduced is more preferably 0.5 to 1000 ml per 1 L of the capacity of the calcining region of the reactor core tube, and most preferably 5 to 500 ml.

The introduction of oxygen into the reactor core tube 12 need not necessarily be carried out after evacuation into a vacuum, and an extremely small amount of oxygen may merely be introduced into the reactor core tube 12 under a neutral gas atmosphere of atmospheric pressure (1 atm.) or a weakly oxidizing atmosphere. Alternatively, the introduction of oxygen may be carried out in such a manner that the amount of oxygen within the reactor core tube 12 is increased while introducing oxygen-containing gas such as air into the reactor core tube 12.

When the calcining is carried out twice or more, preferably, it is performed, for example, in such a manner as described below. The mixture 18 of phosphor materials is once calcined, and thereafter, a calcined product thereof is taken out of a calcining furnace and allowed to stand to be cooled. If necessary, the calcined product is pulverized into fine powder by an ordinary pulverizer such as a mortar, a ball mill, a tube mill, or a centrifugal mill, and thereafter, the pulverized product is calcined repeatedly in the calcining furnace, and the latter calcining (the final calcining) is carried out under the above-described calcining conditions.

It is more preferable that the calcining is carried out in such a manner that the mixture of phosphor materials is once calcined at a calcining temperature in the range from 900 to 1300° C. (first calcining), and thereafter, the calcined product is taken out and pulverized in the above-described manner, and the pulverized product is further calcined at a temperature lower than the above-described calcining temperature, preferably, at 400 to 1000° C.

A powdered stimulable phosphor can be obtained by the above-described calcining.

Further, an annealing step is preferably provided prior to a moving step, which will be described later, and subsequent to the calcining step in which the mixture 18 of phosphor materials is, as described above, calcined at a constant temperature.

The above-described annealing may be carried out immediately after the mixture 18 of phosphor materials has been calcined. However, it is preferable that the annealing is carried out after a certain period of time while a constant temperature is being maintained and while removal and replacement of the atmosphere are being carried out.

In the annealing step, the temperature is controlled so as to slowly decrease from a temperature at which the annealing is started to a predetermined temperature. Particularly, it is preferable, in terms of the aspect of improvement in the light emission characteristics of the stimulable phosphor, that the temperature is decreased at a rate of 0.2 to 5° C./minute and reaches a temperature which is 20 to 300° C. lower than the temperature at the end of the calcining.

In proceeding to the moving step, which will be described later, the temperature of the calcining furnace 10 (calcining region) immediately before opening of the partition door 30 is preferably in the range from 500 to 850° C., and more preferably in the range from 500 to 750° C. In this case, when the calcining temperature is set in the above-described temperature range, it is not particularly necessary that the temperature be changed in proceeding to the moving step. However, when the calcining temperature is set to be higher than the above-described range, it is preferable that the temperature be decreased by the above-described annealing to a temperature within the above-described range.

[Moving Step]

In the moving step, the calcined product of the mixture 18 of phosphor materials obtained in the above-described calcining step is moved from the calcining region to the cooling region. More specifically, in this step, the calcined product of the mixture 18 of phosphor materials is moved to the cooling chamber 28 which is the cooling region by opening the partition door 30, and the partition door 30 is closed again.

In this moving step, it is preferable that the time in which the partition door 30 is in an open state is reduced as far as possible in terms of the aspect of preventing high-temperature gas within the reactor core tube 12 from flowing into the cooling chamber 28. Further, the atmosphere in the calcining region is not necessarily an atmosphere preferable for the cooling region, and therefore, the time in which the partition door 30 is in an open state is desirably reduced to the minimum in terms of the above-mentioned aspect.

The preferable range of the time in which the partition door 30 is opened varies depending on capacities of the calcining region and the cooling region, an area of opening when the partition door 30 is opened, temperatures of the calcining region and the cooling region, and the like. Generally, an entire operation in the moving step, that is, an operation between the opening and the closing of the partition door is carried out preferably within 5 minutes, and more preferably within 2 minutes.

Prior to proceeding to the moving step, preferably, oxygen in the amount of 0.001 to 10 ml, preferably 0.001 to 2 ml at an atmospheric pressure and at 25° C. per 1 L of the capacity of the cooling region is introduced into the cooling chamber 28 which is the cooling region, by the gas introduction/exhaust pipe 34 for the cooling chamber and a weakly oxidizing atmosphere is thereby formed in the cooling region. With the cooling region being in advance made into a weakly oxidizing atmosphere, various characteristics mainly including erasability can be adjusted due to the reaction of a phosphor calcined product during the cooling.

[Cooling Step]

Cooling in the cooling step may be carried out either by a method in which the calcined product is allowed to stand so that the temperature thereof decreases, or a method in which the temperature of the calcined product is controlled by cooling means such as water cooling and is made to decrease. However, the method in which the calcined product is cooled by controlling at a desired temperature is preferable from the aspects of reducing the cooling time and achieving stable preparation of a stimulable phosphor having sufficient characteristics.

A cooling atmosphere in the cooling step may be appropriately set in accordance with purposes. Particularly, the weakly oxidizing atmosphere as described in the moving step is preferably employed.

In the cooling step, preferably, when the calcined product of the mixture 18 of phosphor materials is cooled to a temperature in the range from 300 to 600° C., and preferably in the range from 350 to 500° C., the cooling region is evacuated, and subsequently, cooling is carried out in a neutral atmosphere under reduced pressure. The cooling atmosphere at a low temperature is preferably made into a neutral atmosphere from the standpoint of preventing atmospheric influences from becoming excessive.

The cooling time until the atmosphere is changed is preferably in the range from 0.5 to 20 minutes, and more preferably in the range from 2 to 10 minutes.

The cooling in the cooling step is carried out preferably until the temperature of the calcined product finally reaches 200° C. or less, and more preferably 100° C. or less.

The phosphor prepared by the preparing apparatus or preparing method according to the present invention as described above causes no deterioration in various characteristics essentially demanded for the phosphor, such as a sufficient amount of stimulable light emission, sufficient erasability, formation of a high quality image in a stable manner, and the like.

The phosphor suitably prepared by the preparing apparatus or preparing method of the present invention is represented by the following composition formula (I):

$$(Ba_{1-a}, M^{II}_a)FX \cdot bM^{I} \cdot cM^{III} \cdot dA:xLn \qquad (I)$$

wherein, $M^{II}$ indicates at least one kind of alkaline earth metal selected from the group consisting of Sr, Ca, and Mg; $M^{I}$ indicates at least one kind of alkali metal selected from the group consisting of Li, Na, K, Rb, and Cs; $M^{III}$ indicates at least one kind of trivalent metal compound (not including $Al_2O_3$) selected from the group consisting of Al, Ga, In, Tl, Sc, Y, Cd, and Lu; X indicates at least one kind of halogen selected from the group consisting of Cl, Br, and I; Ln indicates at least one kind of rare earth element selected from the group consisting of Ce, Pr, Sm, Eu, Gd, Tb, Dy, Ho, Nd, Er, Tm, and Yb; A indicates at least one kind of metal oxide selected from the group consisting of $Al_2O_3$, $SiO_2$, and $ZrO_2$; and a, b, c, d, and x are respectively set so as to satisfy relational expressions $0 \leq a \leq 0.3$, $0 \leq b \leq 2$, $0 \leq c \leq 2$, $0 \leq d \leq 0.5$, $0 < x \leq 0.2$.

The phosphor represented by the above-described composition formula (I) is obtained by mixing phosphor materials to form a mixture of phosphor materials so as to have a composition represented by the composition formula (I), and by calcining and cooling the obtained mixture by the phosphor preparing apparatus of the present invention.

EXAMPLES

The present invention will be hereinafter described with reference to examples, but it is not limited by the examples.

Example 1

[Mixing Step]

Material fine particles of BaFBr:Eu and material fine particles of BaFI:Eu were in advance prepared (added to each of the material fine particles were $5 \times 10^{-3}$ mol % of Eu, as an activator, and $1 \times 10^{-3}$ mol % of K, Cs, and Ca based on the amount of Ba during synthesizing). Both material fine particles were mixed together so that the composition ratio of Br to I is 85:15, and 1 wt % of alumina ultra-fine grains was added thereto for the purpose of preventing sintering during the calcining, and mixed sufficiently by a mixer, to thereby obtain a mixture of phosphor materials.

[Preparing Apparatus]

As the preparing apparatus (calcining apparatus) of the example, the preparing apparatus shown in FIG. 1 was used.

Particulars thereof are as follows:

reactor core tube 12: cylindrical quartz tube having a diameter of 20 cm, the capacity of a calcining region is 70 liters;

boat (calcining receptacle) 16: a semi-cylindrical boat made from quartz (upper portion thereof is open), the capacity is 7 liters; and cooling chamber 28: a chamber made from stainless steel, the capacity of a cooling region is 500 liters.

[Calcining Step]

3 kg of the obtained mixture of phosphor materials was placed in the boat (calcining receptacle) 16 and the boat 16 was put into the reactor core tube 12 and set at a predetermined position, and the sample put-in opening lid 24 and the partition door 30 were closed into a sealed state.

The atmosphere within the reactor core tube 12 was evacuated by a vacuum pump, and thereafter, 1.8 liters of oxygen was introduced by the gas introduction/exhaust pipe 20 at an atmospheric pressure and at the calcining temperature (850° C.), and subsequently, nitrogen was introduced to thereby produce an atmospheric pressure, and was adjusted to an atmosphere containing a very small amount of oxygen. Thereafter, the mixture to be calcined was calcined at 850° C. for 2 hours by applying heat from the heat sources 14.

After the calcining, the atmosphere in the reactor core tube 12 was evacuated by the vacuum pump and nitrogen was introduced by the gas introduction/exhaust pipe 20 and replaced. Thereafter, the temperature of the calcining region was decreased to 700° C.

Prior to proceeding to the moving step, the interior of the cooling chamber 28 was in advance adjusted to an atmosphere containing a very small amount of oxygen. That is, after the atmosphere in the cooling chamber 28 has been evacuated by the vacuum pump, 65 ml of oxygen was introduced by the gas introduction/exhaust pipe 34 for the cooling chamber at an atmospheric pressure and at room temperature (25° C.), and nitrogen was subsequently introduced to thereby produce an atmospheric pressure, and adjusted to an atmosphere containing a very small amount of oxygen.

[Moving Step]

The partition door 30 was brought into an open state and the boat (calcining receptacle) 16 having the phosphor (the calcined product of the mixture of phosphor materials) calcined in the above-described calcining step accommodated therein was moved to slide in the direction indicated by arrow z and placed on the cooling stand 32. Subsequently, the partition door 30 in the open state was closed again into a sealed state (at this time, the sample outlet lid 38 was also closed into a sealed state). The time in which the partition door 30 was opened was 30 seconds.

[Cooling Step]

With the interior of the cooling chamber 28 being maintained in a state of the atmosphere containing a very small amount of oxygen as described above, the calcined product was allowed to stand for 5 minutes. Thereafter, the temperature of the calcined product was 400° C. The calcined product of the mixture 18 of phosphor materials accommodated in the boat (calcining receptacle) 16 was cooled down to 100° C. over 1 hour while evacuating gas by the gas introduction/exhaust pipe 34 for the cooling chamber, and taken out of the cooling chamber 28 to thereby obtain a rare earth-activated barium fluorohalide based phosphor.

Comparative Example 1

[Mixing Step]

A mixture of phosphor materials was obtained by carrying out the mixing step in the same way as in the example 1.

[Preparing Apparatus]

A preparing apparatus (calcining apparatus) used in the comparative example is only comprised of a calcining section A shown in FIG. 1 (an end portion thereof at the side of the partition door 30 is sealed) and the reactor core tube 12 can be pulled out from the calcining furnace 10. Other structures of the apparatus are the same as in the example 1.

[Calcining Step]

3 kg of the obtained mixture of phosphor materials was placed in the boat (calcining receptacle) 16 and the boat 16 was put into the reactor core tube 12 and set at a predetermined position, and the sample put-in opening lid 24 was closed into air tightness.

The atmosphere in the reactor core tube 12 was evacuated by a vacuum pump, and thereafter, 1.8 liters of oxygen was introduced by the gas introduction/exhaust pipe 20 at an atmospheric pressure and at the calcining temperature (850° C.), followed by the introduction of nitrogen to form an atmospheric pressure, and the interior of the reactor core tube 12 was adjusted to an atmosphere containing a very small amount of oxygen. Thereafter, the mixture to be calcined was calcined at 850° C. for 2 hours by applying heat from the heat sources 14.

After the calcining, the atmosphere in the reactor core tube 12 was evacuated by the vacuum pump and replaced with nitrogen by introducing nitrogen by the gas introduction/exhaust pipe 20. Thereafter, the temperature of the calcining region was decreased to 700° C.

[Cooling Step]

The reactor core tube 12 was pulled out from the calcining furnace 10 and cooled down to a room temperature while carrying out evacuation by the vacuum pump. The calcined product was taken out of the reactor core tube 12 and a rare earth-activated barium fluorohalide based phosphor of the comparative example 1 was obtained. The time required for the process to the cooling was 3 hours.

Evaluation Tests

The obtained rare earth-activated barium fluorohalide based phosphors of the example 1 and the comparative example 1 were evaluated by carrying out tests described below.

(1) Amount of Stimulable Light Emission

Grains of each of the above-described phosphors were homogeneously packed in a cylindrical holder having a thickness of 1 mm and an opening of 10 mm $\phi$. The surface of each phosphor at the opening portion of the cylindrical holder was irradiated with 100 mR of an X-ray having a tube voltage of 80 kVp, followed by the irradiation and excitation with semiconductor laser light (whose wavelength is 660 nm) having an excitation energy of 4.3 J/m². Subsequently, stimulable emission light radiated from the phosphor grains was received by a photomultiplier tube via an optical filter (B-410), and an amount of stimulable emission light was measured. The measured value was indicated as a relative value with the value obtained in the stimulable phosphor of the comparative example 1 set as 100. The results are shown in the table 1 below.

(2) Erasability

The surface of each of the phosphors at the opening portion of the cylindrical holder was irradiated with 100 mR of an X-ray having a tube voltage of 80 kVp, followed by the irradiation and excitation with semiconductor laser light (whose wavelength is 660 nm) having an excitation energy of 4.3 J/m². Subsequently, stimulable emission light radiated from the phosphor grains was received by a photomultiplier tube via an optical filter (B-410), and an initial stimulable emission amount was measured.

Subsequently, an erasure operation was carried out by applying, onto the phosphor, light emitted from a three-band type daylight fluorescent lamp at 100 millions lux per second. Thereafter, the amount of stimulable emission light of the stimulable phosphor after the erasure operation was measured for each of the cylindrical holders in the same way as in the measurement of the initial stimulable emission amount.

The erasability of each phosphor is represented by an erasure value obtained by the following expression. As the numerical value becomes smaller, the erasability improves.

Erasure value=(stimulable emission amount after the erasure/initial stimulable emission amount)

The obtained calculation results are given in the table 1.

TABLE 1

| | Stimulable emission amount | Erasure value |
|---|---|---|
| Example 1 | 102 | $1.5 \times 10^{-5}$ |
| Comparative Example 1 | 100 | $4.0 \times 10^{-4}$ |

As is clear from the table 1, the rare earth-activated barium fluorohalide based phosphor of the example 1 prepared by using the preparing apparatus of the present invention was excellent in that the stimulable emission amount and erasability are both sufficient.

As described above, the present invention can provide an apparatus for preparing a rare earth-activated barium fluorohalide based phosphor in which the states of atmosphere during the calcining and the cooling can be optimally adjusted and a cooling rate can be selected in a wide range.

Further, according to the present invention, there can be provided a method for preparing a rare earth-activated barium fluorohalide based phosphor by using the preparing apparatus having the above-described excellent functions, in which conditions by which a stimulable phosphor having excellent stimulable light emission characteristics and erasability can be obtained are set.

What is claimed is:

1. A method for preparing a rare earth-activated barium fluorohalide based phosphor, comprising the steps of:
   (a) preparing a mixture of rare earth-activated barium fluorohalide based phosphor precursor materials;
   (b) providing a furnace having a calcining chamber and a cooling chamber connected to the calcining chamber, with a partition selectively movable for opening and closing the chambers to and from one another;
   (c) calcining the mixture of phosphor precursor materials in the calcining chamber of said furnace to form a calcined product; and
   (d) cooling the calcined product by moving the calcined product into the cooling chamber of the furnace and thereafter moving the partition to the closed position.

2. A method for preparing a rare earth-activated barium fluorohalide based phosphor according to claim 1, wherein a rare earth-activated barium fluorohalide based phosphor to be obtained is represented by the following composition formula (I):

$$(Ba_{1-a}, M^{II}_a)FX \cdot bM^{I} \cdot cM^{III} \cdot dA{:}xLn \quad (I)$$

wherein, $M^{II}$ indicates at least one kind of alkaline earth metal selected from the group consisting of Sr, Ca, and Mg; $M^{I}$ indicates at least one kind of alkali metal selected from the group consisting of Li, Na, K, Rb, and Cs; $M^{III}$ indicates at least one kind of trivalent metal compound, not including $Al_2O_3$, selected from the group consisting of Al, Ga, In, Tl, SC, Y, Cd, and Lu; X indicates at least one kind of halogen selected from the group consisting of Cl, Br, and I; Ln indicates at least one kind of rare earth element selected from the group consisting of Ce, Pr, Sm, Eu, Gd, Tb, Dy, Ho, Nd, Er, Tm, and Yb; A indicates at least one kind of metal oxide selected from the group consisting of $Al_2O_3$, $SiO_2$, and $ZrO_2$; and a, b, c, d, and x are respectively set so as to satisfy relational expressions $0 \leq a \leq 0.3$, $0 \leq b \leq 2$, $0 \leq c \leq 2$, $0 \leq d \leq 0.5$, $0 < x \leq 0.2$.

3. A method for preparing a rare earth-activated barium fluorohalide based phosphor according to claim 1, wherein the step of calcining is performed at a temperature in a range from 500 to 1100° C.

4. A method for preparing a rare earth-activated barium fluorohalide based phosphor according to claim 1, wherein the step of calcining is performed for a duration lasting from 1 to 10 hours.

5. A method for preparing a rare earth-activated barium fluorohalide based phosphor according to claim 1, wherein the step of calcining is performed with the partition in the closed position, and when beginning the step of cooling the calcined product, the partition is moved to the open position, and the temperature in the calcining region immediately prior to moving the partition to the open position, is in a range from 500 to 850° C.

6. A method for preparing a rare earth-activated barium fluorohalide based phosphor according to claim 1, wherein the step of cooling requires no more than 5 minutes for moving the calcined product into the cooling region and moving the partition to the closed position.

7. A method for preparing a rare earth-activated barium fluorohalide based phosphor according to claim 1, further comprising the step of introducing 0.001 to 10 ml of oxygen per 1 L of cooling region capacity at approximately atmospheric pressure and at approximately 25° C. into the cooling region, prior to the step of cooling, for producing a weakly oxidizing atmosphere in the cooling region.

8. A method for preparing a rare earth-activated barium fluorohalide based phosphor according to claim 1, wherein the step of cooling is performed until the calcined product has cooled to a temperature in a range from 300 to 600° C., and thereafter further comprising the step of evacuating and replacing an atmosphere in the cooling region with a neutral atmosphere under reduced pressure for further cooling.

9. A method for preparing a rare earth-activated barium fluorohalide based phosphor, comprising the steps of:

(a) preparing a mixture of phosphor precursor materials;

(b) providing a furnace having a calcining chamber and a cooling chamber connected to the calcining chamber, with a partition selectively movable for opening and closing the chambers to and from one another;

(c) calcining the mixture of phosphor precursor materials in the calcining chamber, with the chambers closed from one another; and (d) cooling the calcined product by opening the chambers to one another and moving the calcined product into the cooling chamber and thereafter closing the chambers from one another.

10. A method for preparing a rare earth-activated barium fluorohalide based phosphor according to claim 9, wherein a rare earth-activated barium fluorohalide based phosphor to be obtained is represented by the following composition formula (I):

$$(Ba_{1-a}, M^{II}_{a})FX \cdot bM^{I} \cdot cM^{III} \cdot dA : xLn \qquad (I)$$

wherein: $M^{II}$ indicates at least one kind of alkaline earth metal selected from the group consisting of Sr, Ca, and Mg; $M^{I}$ indicates at least one kind of alkali metal selected from the group consisting of Li, Na, K, Rb, and Cs; $M^{III}$ indicates at least one kind of trivalent metal compound, not including $Al_2O_3$, selected from the group consisting of Al, Ga, In, Tl, SC, Y, Cd, and Lu; X indicates at least one kind of halogen selected from the group consisting of Cl, Br, and I; Ln indicates at least one kind of rare earth element selected from the group consisting of Ce, Pr, Sm, Eu, Gd, Tb, Dy, Ho, Nd, Er, Tm, and Yb; A indicates at least one kind of metal oxide selected from the group consisting of $Al_2O_3$, $SiO_2$, and $ZrO_2$; and a, b, c, d, and x are respectively set so as to satisfy relational expressions $0 \leq a \leq 0.3$, $0 \leq b \leq 2$, $0 \leq c \leq 2$, $0 \leq d \leq 0.5$, $0 < x \leq 0.2$.

11. A method for preparing a rare earth-activated barium fluorohalide based phosphor according to claim 9, wherein the step of calcining is performed at a temperature in a range from 500 to 1100° C.

12. A method for preparing a rare earth-activated barium fluorohalide based phosphor according to claim 9, wherein when beginning the step of cooling, the temperature in the calcining chamber immediately before prior to opening the chambers to one another is in a range from 500 to 850° C.

* * * * *